United States Patent
Deckard et al.

(10) Patent No.: US 8,998,662 B2
(45) Date of Patent: Apr. 7, 2015

(54) BEARING HOUSING

(71) Applicant: Ride the Ducks International, LLC, Atlanta, GA (US)

(72) Inventors: Brian Deckard, Nixa, MO (US); Frank English, Branson, MO (US)

(73) Assignee: Ride The Ducks International, LLC, Atlanta, GA (US)

( * ) Notice: Subject to any disclaimer, the term of this patent is extended or adjusted under 35 U.S.C. 154(b) by 0 days.

(21) Appl. No.: 14/109,004

(22) Filed: Dec. 17, 2013

(65) Prior Publication Data

US 2014/0169709 A1 Jun. 19, 2014

Related U.S. Application Data

(60) Provisional application No. 61/738,257, filed on Dec. 17, 2012.

(51) Int. Cl.
| | | |
|---|---|---|
| *B63H 23/24* | (2006.01) | |
| *F16C 33/74* | (2006.01) | |
| *F16C 33/76* | (2006.01) | |
| *F16C 35/04* | (2006.01) | |
| *F16C 35/02* | (2006.01) | |
| *F16C 33/78* | (2006.01) | |

(52) U.S. Cl.
CPC ............ *F16C 35/042* (2013.01); *F16C 33/74* (2013.01); *F16C 35/02* (2013.01); *F16C 33/7886* (2013.01)

(58) Field of Classification Search
CPC ........ Y10S 277/91; F16C 33/74; F16C 33/76; F16C 33/7886; F16C 35/02; F16C 35/042
USPC ................ 384/130, 139, 148, 149, 151–155, 384/416–418, 477–489, 543–547; 440/83, 440/112; 277/534, 537, 539, 549, 551, 562, 277/910
See application file for complete search history.

(56) References Cited

U.S. PATENT DOCUMENTS

| | | | | |
|---|---|---|---|---|
| 3,006,699 A | * | 10/1961 | Erlbacher | ...................... 384/103 |
| 3,177,841 A | * | 4/1965 | Galuska | ........................ 440/112 |
| 3,305,280 A | | 2/1967 | Peterson | |
| 3,751,124 A | | 8/1973 | Hanson et al. | |
| 3,934,952 A | | 1/1976 | Gardner | |
| 4,381,127 A | * | 4/1983 | Visser | ........................... 384/151 |

(Continued)

FOREIGN PATENT DOCUMENTS

GB 1409395 A 10/1975

OTHER PUBLICATIONS

International Search Report for PCT Application No. PCT/US2013/75778; mailed May 22, 2014.

*Primary Examiner* — Phillip A Johnson
(74) *Attorney, Agent, or Firm* — Troutman Sanders LLP; Ryan A. Schneider; Benjamin C. Wiles

(57) ABSTRACT

A system for providing sealed shaft bearing is disclosed. The system can include housing and one or more end caps. The end caps can house one or more seals and one or more bearings for supporting a shaft. The housing can be watertight to prevent water from infiltrating the housing and to prevent lubricant, if any, from escaping the housing into the environment. The system can use a multi-piece design to facilitate repair and maintenance. The system can be easily retrofitted into systems, such as marine systems, that use conventional plain shaft bearings.

18 Claims, 9 Drawing Sheets

(56) References Cited

U.S. PATENT DOCUMENTS

| | | |
|---|---|---|
| 4,524,977 A | 6/1985 | Masaaki |
| 4,710,142 A | 12/1987 | Lovell |
| 5,054,329 A | 10/1991 | Morishita et al. |
| 8,087,172 B2 | 1/2012 | Farris et al. |
| 8,393,794 B1* | 3/2013 | Shiraishi ................. 384/458 |
| 2003/0054712 A1* | 3/2003 | Fuse et al. ................ 440/112 |
| 2004/0092177 A1* | 5/2004 | Creighton ................. 440/82 |

* cited by examiner

BEARING HOUSING

CROSS REFERENCE TO RELATED APPLICATIONS

This application claims priority, and benefit under 35 U.S.C. §119(e), to U.S. Provisional Patent Application No. 61/738,257, of the same title, filed Dec. 17, 2012, which is herein incorporate by reference as if fully set forth below.

BACKGROUND

1. Field of the Invention

Embodiments of the present invention relate generally to bearing housings for supporting a variety of shafts, and more specifically to a bearing housing capable of use in wet and/or dry applications.

2. Background of Related Art

A variety of systems exist to support shafts in machinery. The Automotive industry uses, for example, and not limitation, plain bearings, ball bearings, and needles bearings. Plain bearings are used, for example, to support engine crankshafts and camshafts. These bearing are generally pressure fed lubricant, such as motor oil, such that the supported shaft is actually supported on a thin film of oil. Properly sized (i.e., clearanced) plain bearings are inexpensive and long lasting, but the requirement for pressurized lubrication makes them impractical for some applications.

Ball bearings and needle bearings, on the other hand, rely on multiple balls or cylinders disposed circumferentially around a shaft and contained by one or more bearing races. In this configuration, because the balls or needles are free to rotate, friction between the bearing and the shaft is reduced. As a result, while these bearings may use pressurized lubrication, they often function with only a packing of grease, or other heavy lubricant, to provide some lubrication and cooling. A type of roller bearing, known as a taper bearing, is often used for automotive wheel bearings, for example. Wheel bearings can be packed with grease and can run for tens of thousands of miles without maintenance.

The propeller shaft ("prop shaft") on a boat or other aquatic vehicle, on the other hand, presents a unique challenge. This challenge is created by the fact that the shaft must be attached to the engine or transmission on one end and a propeller on the other end. This is challenging because, generally speaking, the engine is inside the vehicle and dry, while the propeller is obviously at least partially in the water. In addition, due to the layout of many aquatic vehicles, the prop shaft tends to be fairly long, requiring some support in the middle to prevent excessive deflection, or "whip."

Conventional prop shaft bearings tend to be simple plain bearings that are constructed of brass, or some other metal, that has some lubricity. These bearings do not rotate with the shaft, however, and thus, rely on the shaft being submerged in water for cooling and lubrication. Because water provides only minimal lubrication, however, these bearing tend to have a limited service life. In addition, the service life can be further reduced if the bearing is operated out of the water for any significant length of time (i.e., more than a few seconds). This can nonetheless occur during, for example and not limitation, maintenance or use on an amphibious vehicle.

What is needed, therefore, is an improved, self-contained, self lubricating bearing system for prop, and other, shafts. The system should include an improved bearing housing capable of sealing lubricants in and water out. The system should also provide increased maintenance intervals and improved access for maintenance. It is to such a system that embodiments of the present invention are primarily directed.

BRIEF SUMMARY

Embodiments of the present invention relate generally to an improved bearing housing and more specifically to an improved bearing housing for supporting rotating shafts in a variety of applications. In some embodiments, the bearing system can comprise a housing, a first bearing end cap, and a second bearing end cap. The end caps can be detachably coupleable to the bearing housing. The end caps can contain one or more bearings and one or more seals to seal lubricants inside the housing and water out of the housing, among other things.

In some embodiments, the system can further comprise one or more covers detachably coupled to the end caps to retain the one or more seals and/or seal the end caps. In some embodiments, the end caps can be detachably coupled to the housing a plurality of fasteners. In other embodiments, the end caps can be threadably engaged with the housing.

Embodiments of the present invention can also comprise a method for installing a bearing housing on a vehicle. The method can comprise removing any existing bearing housings, preparing the existing bearing housing support, if necessary, and welding or otherwise affixing the new bearing housing to the vehicle. The end caps with bearings and seals can be detachably affixed to the housing along with end cap covers, if applicable. The prop shaft can be installed in, and reattached to the vehicle to complete the installation. Due to the multi-piece design of the bearing housing, the components of the system and the prop shaft can be installed in a variety of sequences without affecting the installation.

Embodiments of the present invention can comprise a system for supporting a shaft comprising a main housing, a first bearing end cap, comprising a first end and a second end. In some embodiments, the first bearing end cap can comprise one or more bearings disposed in the first end of the first bearing end cap to at least partially support a shaft and one or more seals, disposed in the second end of the first bearing end cap to provide a substantially watertight seal between the first bearing end cap and the shaft. The first end of the first bearing end cap cab be detachably coupled to a first end of the housing. In some embodiments, the coupling between the first bearing end cap and the housing can be substantially watertight.

In some embodiments, one or more o-rings can be disposed on the first end of the first bearing end cap for sealing the first bearing end cap to the housing. In other embodiments, the one or more seals can provide a watertight seal between the second end of the end cap and the shaft. In some embodiments, the one or more bearings can be roller bearings. In some embodiments, the system can also include one or more fasteners to detachably couple the first end of the first bearing end cap to the housing. In other embodiments, the first end of the first bearing end cap threadably engages the housing Embodiments of the present invention can further comprise a system for supporting a shaft comprising a main housing comprising a first end and a second end, a first bearing end cap, comprising a first end, a second end, the first end detachably coupled to the first end of the main housing, and a second bearing end cap, comprising a first end, a second end, a second bearing, and a second seal, the first end detachably coupled to the second end of the main housing. The system can further comprise a first bearing disposed in the first end of the first bearing cap to partially support a shaft and a second bearing disposed in the first end of the second bearing cap to partially support the shaft. In some embodiments, the system can also comprise a first seal disposed in the second end of the first bearing cap to provide a substantially watertight seal between the shaft and the first bearing end cap and a second seal disposed in the second end of the second bearing cap to provide a substantially watertight seal between the shaft and the second bearing end cap. In some embodiments, the coupling between the first and second bearing end caps and the housing is substantially watertight.

In some embodiments, the system can comprise a third seal disposed on the first side of the first bearing end cap sealing against the first end of the main housing and a fourth seal disposed on the first side of the second bearing end cap sealing against the second end of the main housing. The first and second seals can be, for example and not limitation, o-rings. The system can further comprise a first bearing housing cover disposed on the second end of the first bearing end cap and a second bearing housing cover disposed on the second end of the second bearing end cap. In other embodiments, the system can comprise a third seal disposed on the second side of the first bearing end cap sealing against the first bearing housing cover and a fourth seal disposed on the second side of the second bearing end cap sealing against the second bearing housing cover.

In some embodiments, the first and second seals can be, for example and not limitation, lip seals or rope packing. In some embodiments, the bearings can be roller bearings. The system can also include a lubricant disposed in the main housing to lubricate the first and second bearings. In this configuration, plain bearings can be utilized to support the shaft. In some embodiments, the first and second bearing housings can be threadably coupled to the main housing; while in other embodiments, the system can include a plurality of fasteners to detachably couple the first and second bearing housings to the main housing.

These and other objects, features and advantages of the present invention will become more apparent upon reading the following specification in conjunction with the accompanying drawing figures.

DETAILED DESCRIPTION

Embodiments of the present invention relate generally to an improved bearing housing and more specifically to an improved bearing housing for supporting rotating shafts in a variety of applications. In some embodiments, the bearing system can comprise a bearing housing, a first bearing cap, and a second bearing cap. The bearing caps can be detachably coupleable to the bearing housing. The bearing caps can contain one or more bearings and one or more seals to seal lubricants inside the housing and water out of the housing, among other things. In some embodiments, the system can further comprise covers for sealing the end caps and/or retaining the seals.

To simplify and clarify explanation, the system is described below as a system for use with marine propeller shafts ("prop shafts"). One skilled in the art will recognize, however, that the invention is not so limited. The system can also be deployed for use with a variety of marine and non-marine applications that include shafts or other mechanisms that need to be supported and/or sealed. As a result, the system can also be deployed, for example and not limitation, for use with automotive driveshafts, pneumatic and hydraulic cylinders, and axles.

The materials described hereinafter as making up the various elements of the present invention are intended to be illustrative and not restrictive. Many suitable materials that would perform the same, or a similar, function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

Figure 1:
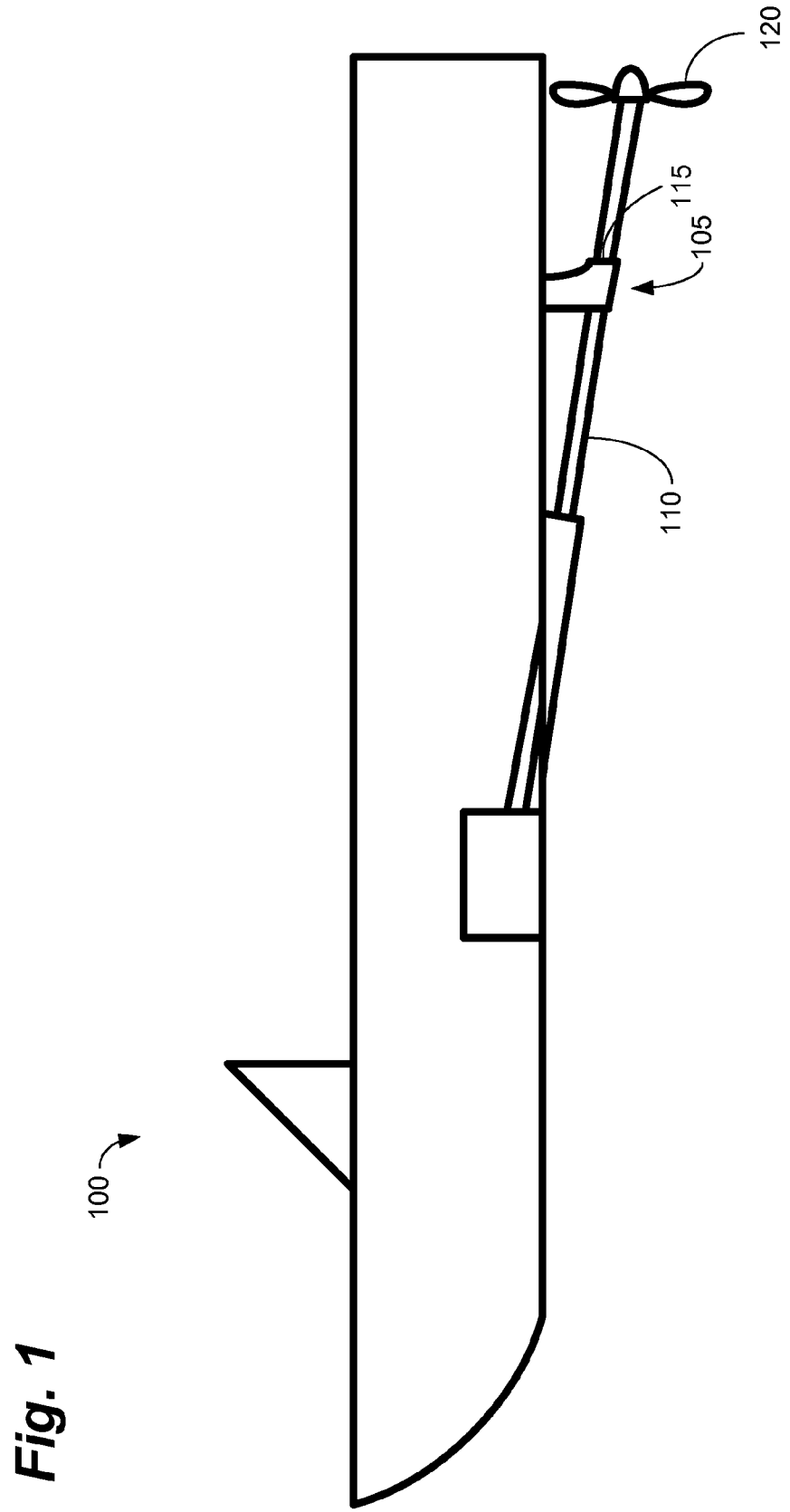
FIG. 1 depicts a conventional prop shaft support bearing in a motor boat.

As shown in FIG. 1, a conventional prop shaft support 105, shown here as part of a motor boat 100, supports the prop shaft 110 with a simple, plain bearing 115 disposed in the support housing 105. As discussed above, a problem with these plain bearings 115 is that they rely on water for cooling and lubrication. As a result, in situation where the prop shaft 110 must be run "dry" (i.e., out of the water), excessive wear on the bearing 115 quickly occurs. It may be necessary to run the prop shaft 110 dry during maintenance, for example, or because the prop shaft 110 is used on an amphibious vehicle and must be engaged prior to entering the water.

One solution to running the prop shaft 110 dry would be providing some sort of lubrication. This task is complicated for use with marine products, however, because lubricants generally have a negative impact on the environment. Even small amounts of petroleum products, for example, can create a large sheen on the water preventing oxygen from entering the water and suffocating plant and animal life. As a result, in many jurisdictions, a boat owner can be cited and fined merely for a visible sheen on the water due to petroleum products in the vicinity of his or her vehicle.

Another solution would be to provide friction reducing bearings in the shaft support such as, for example and not limitation, ball, roller, or needle bearings. These bearings tend to largely, or wholly, comprise steel, however, which rusts in contact with moisture. This problem is not easily solved with corrosion resistant materials (e.g., aluminum or stainless steel) because these materials tend to be too soft for use in bearings. In marine use, therefore, and particularly in salt water, a ball bearing can quickly become rusted, pitted, and useless.

What is needed, therefore, is a bearing housing that is self-contained to provide the bearings with lubrication and protection, while preventing lubricants from leaking into the environment. The bearing housing should improve serviceability by locating the bearings and seals in easily removable caps. The bearing housing should also provide a convenient means of checking for water infiltration. It is to such housing that embodiments of the present invention are primarily directed.

Figure 2:
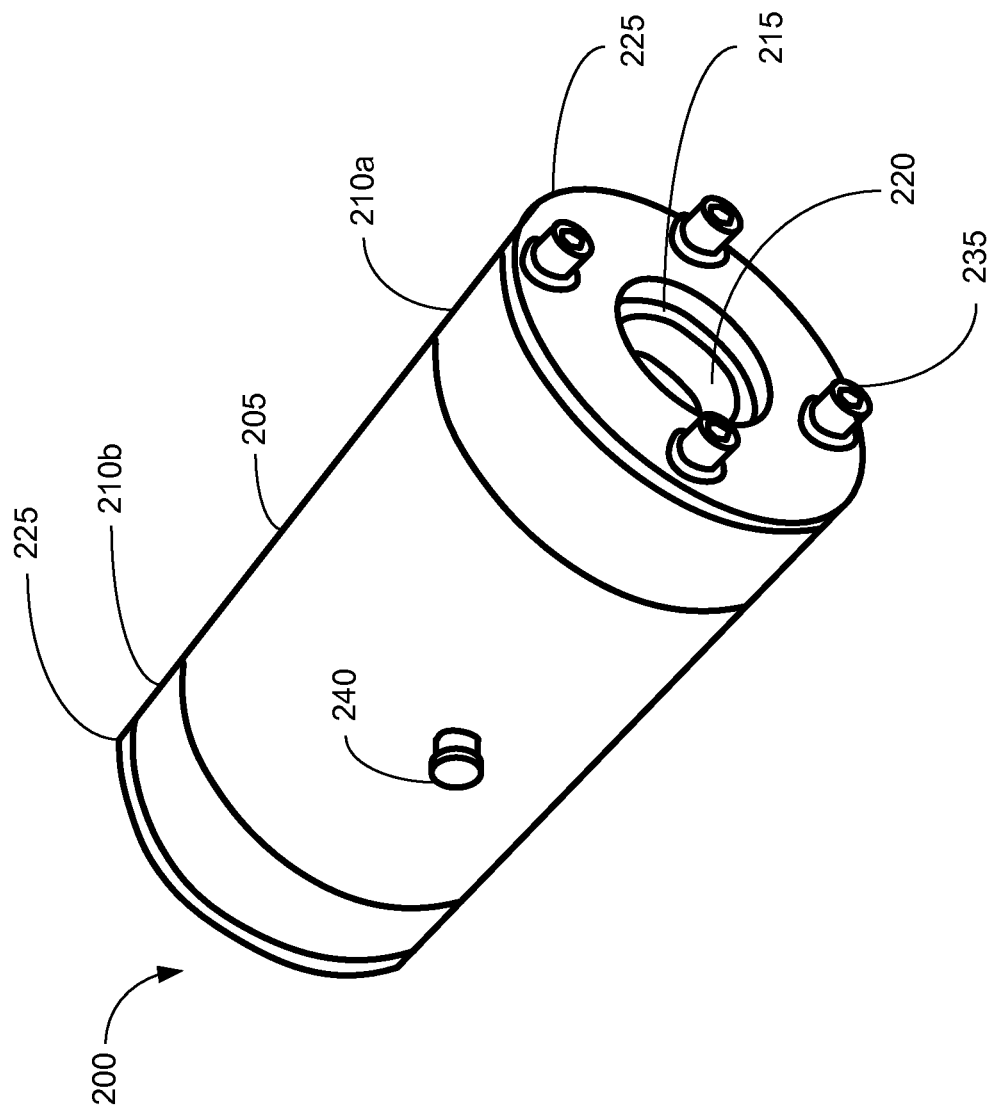
FIG. 2 depicts a bearing housing, in accordance with some embodiments of the present invention.
Figure 3A:
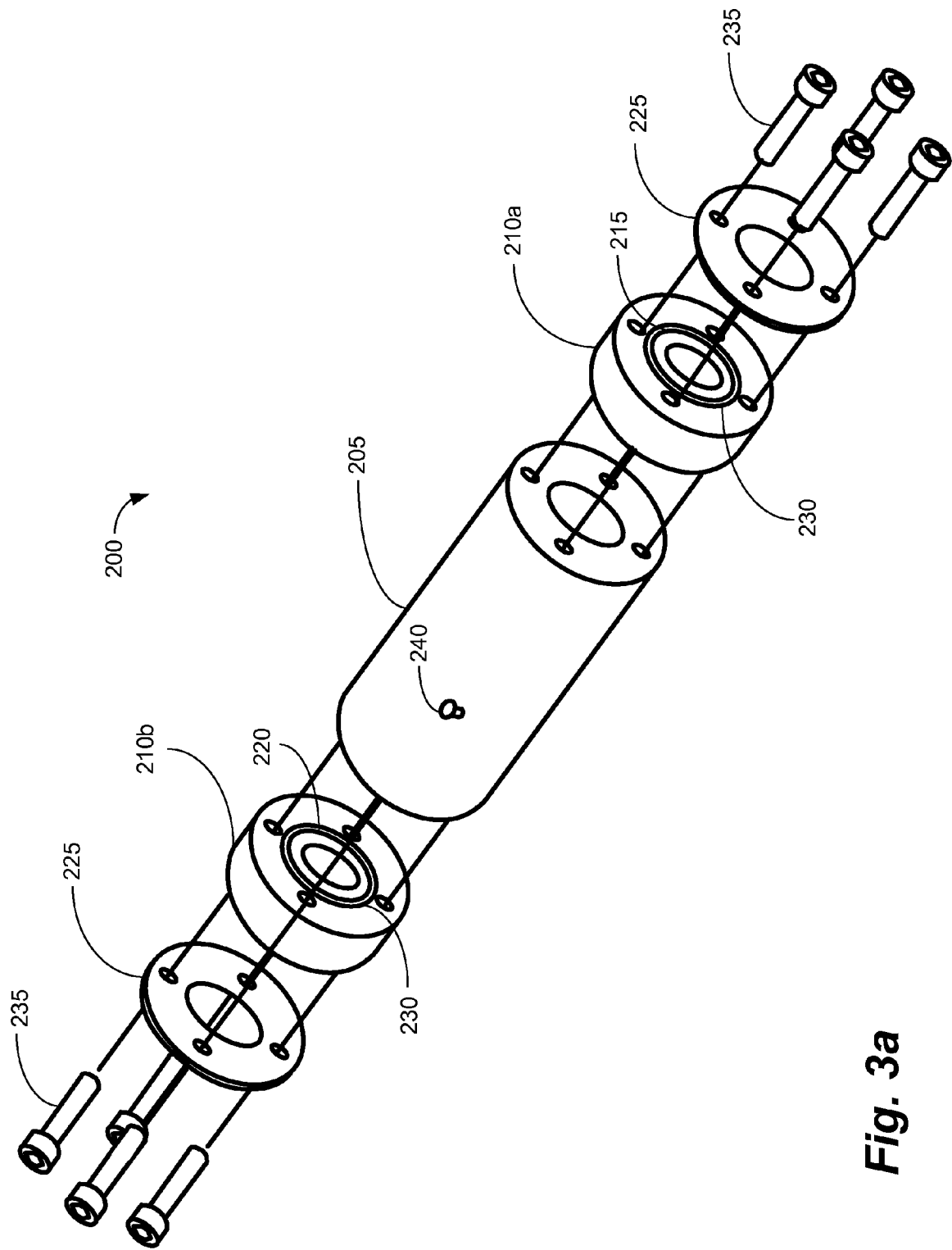
FIG. 3a depicts an exploded view of the prop shaft housing of FIG. 2, in accordance with some embodiments of the present invention.
Figure 3B:
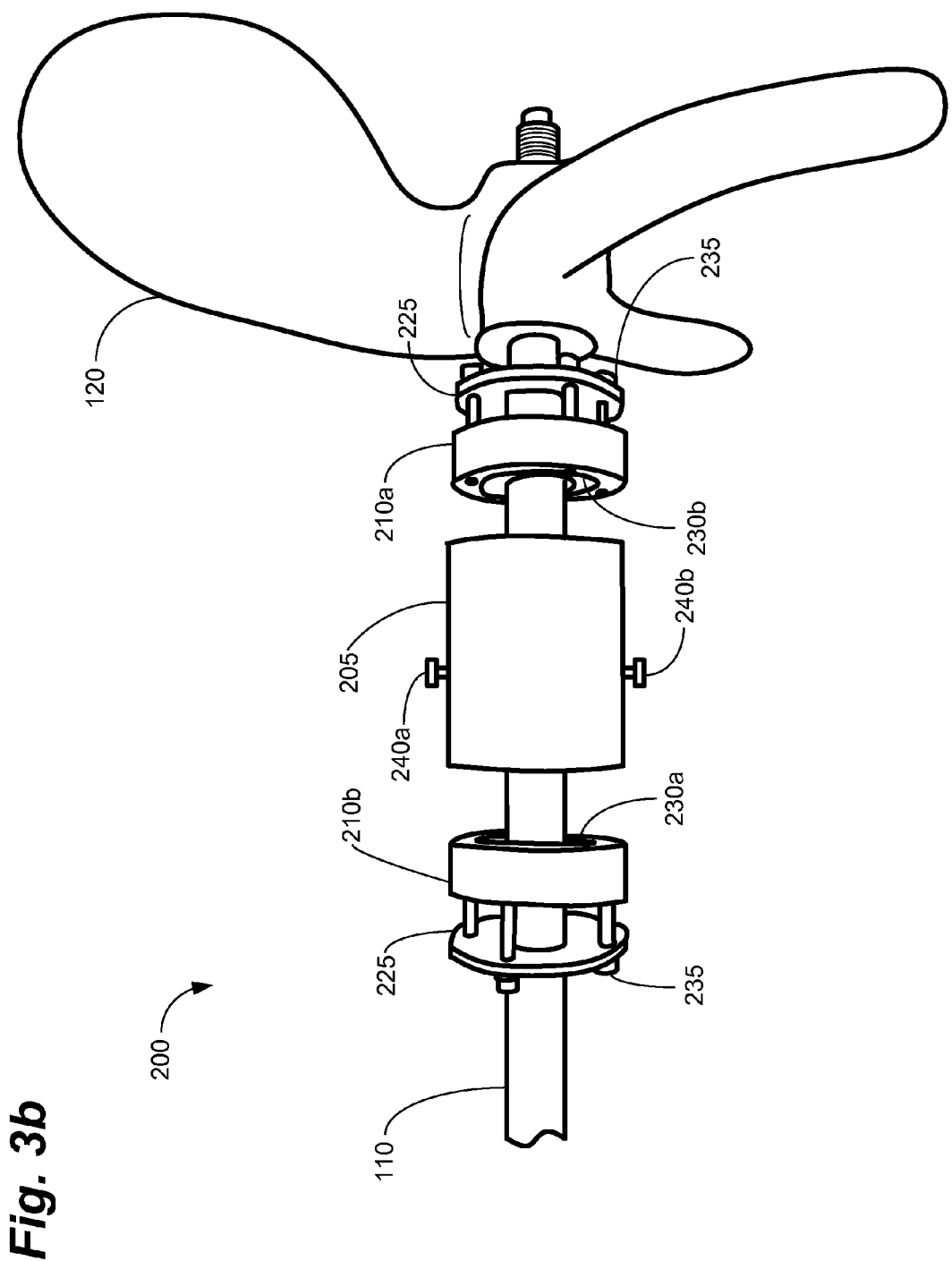
FIG. 3b depicts an exploded view of the prop shaft housing of FIG. 2 installed on a prop shaft, in accordance with some embodiments of the present invention.
Figure 3C:
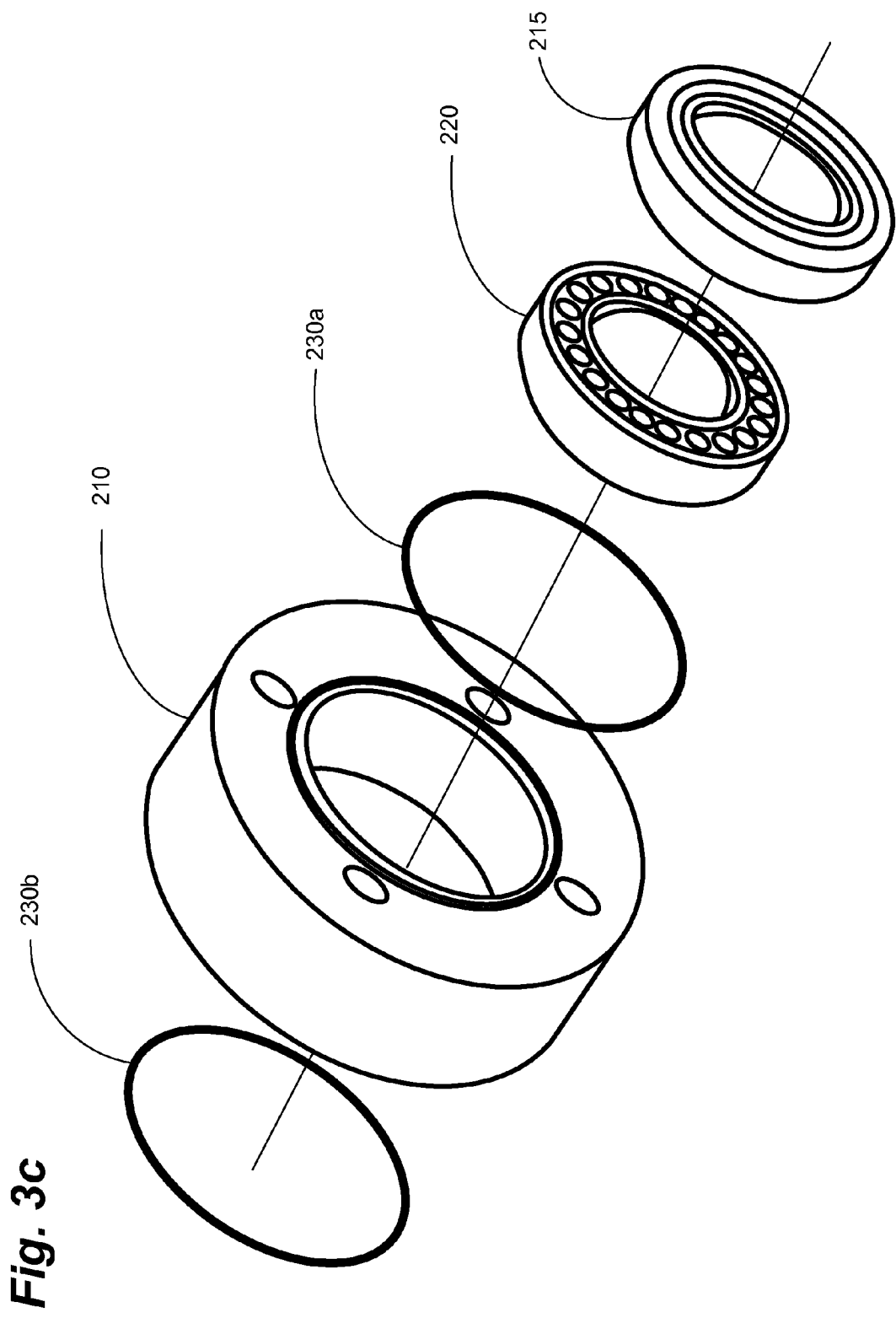
FIG. 3c depicts an exploded view of a bearing housing for the prop shaft housing of FIG. 2, in accordance with some embodiments of the present invention.

As shown in FIG. 2, and in detail in FIGS. 3a-3c, embodiments of the present invention relate to a self-contained, sealed bearing housing system 200. In some embodiments, the system 200 can comprise a main housing 205 and one or more end caps 210a and 210b, or bearing housings. The end caps 210 can each comprise one or more seals 215 and one or more bearings 220. In some embodiments, the system 200 can further comprise one or more bearing housing covers 225.

As shown in FIGS. 3a-3c, the system 200 can comprise one or more bearings 220 disposed in a first end of the end cap 210. The bearings 220 can be, for example, and not limitation, plain, roller, or needle type bearings. In some embodiments, the bearings 220 can be pressed into the end cap 210. In other embodiments, the bearings 220 can be slip fit into the housings and retained by a circlip, safety wire, or other suitable means. In still other embodiments, the bearings can be, for example and not limitation, swaged, welded, or brazed into the end caps 210.

The system 200 can further comprise one or more seals 215 disposed in a second end of the end cap 210. The seals 215 can be, for example and not limitation, one or multi-piece marine or automotive style lip seals, rope seals, or o-rings. The seals 215 can seal the area between the end caps 210 and the shaft. In some embodiments, the system 200 can further comprise a bearing housing cover 225 to seal the end of the bearing housing and retain the seal 215. In other embodiments, the seals 215 can be pressed into the second end of the end cap 210, obviating the need for a bearing housing cover 225

In some embodiments, the end caps 210 can further comprise one or more o-rings 230. The o-rings 230 can be retained, for example, in grooves cast or machined into the end caps 210. In some embodiments, the end caps 210 can comprise an o-ring 230 disposed on both sides. In this manner, an o-ring 230a on the first side of the end cap 210 can seal the end cap 210 against the housing 205, while an o-ring 230b on the second side of the end cap 210 can seal the end cap 210 against the bearing housing cover 225. As mentioned above, in some embodiments, the end caps 210 can comprise a lip seal pressed into the second side of the end cap 210 substantially sealing the second end of the end cap 210. In this configuration, an o-ring 230 can be used only to seal the first end of the end cap 210 to the housing 205 and the second o-ring may be obviated.

As shown in FIGS. 3a-3b, the system 200 can be assembled using a plurality of fasteners 235. In some embodiments, the system 200 can comprise a bearing housing cover 225 and a end cap 210 detachably coupled to each end of the main housing 205 with the plurality of fasteners 235. In some embodiments, the fasteners can be, for example and not limitation, bolts, machine screws, pins, or rivets. In a preferred embodiment, the fasteners 235 can be stainless steel caps screws to reduce corrosion and ease maintenance. In some embodiments, the fasteners 235 can thread into threaded holes in the main body 205. In other embodiments, the fasteners 235 can be through-bolts that extends through the main body 205, caps 210, and covers 225 (if applicable) and can be secured on one end with nuts and washers (not shown), or other suitable fasteners.

As shown in FIG. 3c, the seals 215 can be placed on the outboard side of each end cap 210 and the bearings 220 can be placed on the inboard side of each end cap 210. In this configuration, the bearings 220 are protected from, for example, water, dirt, and debris. In some embodiments, the bearings 220 can be, for example, packed with grease or partially or fully submerged in lubricant. In this configuration, the seals 215 also serve to contain the lubricant. This not only maintains lubrication for the bearings 220, but also prevents environmental contamination. In some embodiments, the housing may be partially, or wholly, filled with lubricant (e.g., motor oil or hypoid gear oil), grease, or other suitable friction reducing agent.

In some embodiments, the housing 205 can comprise an inspection port 240. The inspection port 240 can comprise a hole in the housing 205 to monitor water infiltration and/or lubricant levels and quality. In some embodiments, the inspection port 240 can be, for example, a simple hole with a press fit or rubber drain plug. In other embodiments, the inspection port 240 can be a threaded hole with a threaded plug. In some embodiments, the inspection port 240 can also serve as a fill port for lubricant. In still other embodiments, as shown in FIG. 3b, the housing 205 can comprise an inspection port/fill port 240a and a drain plug 240b to enable the fluid to be changed in the housing 205 or to drain water, for example, therefrom.

Figure 3D:
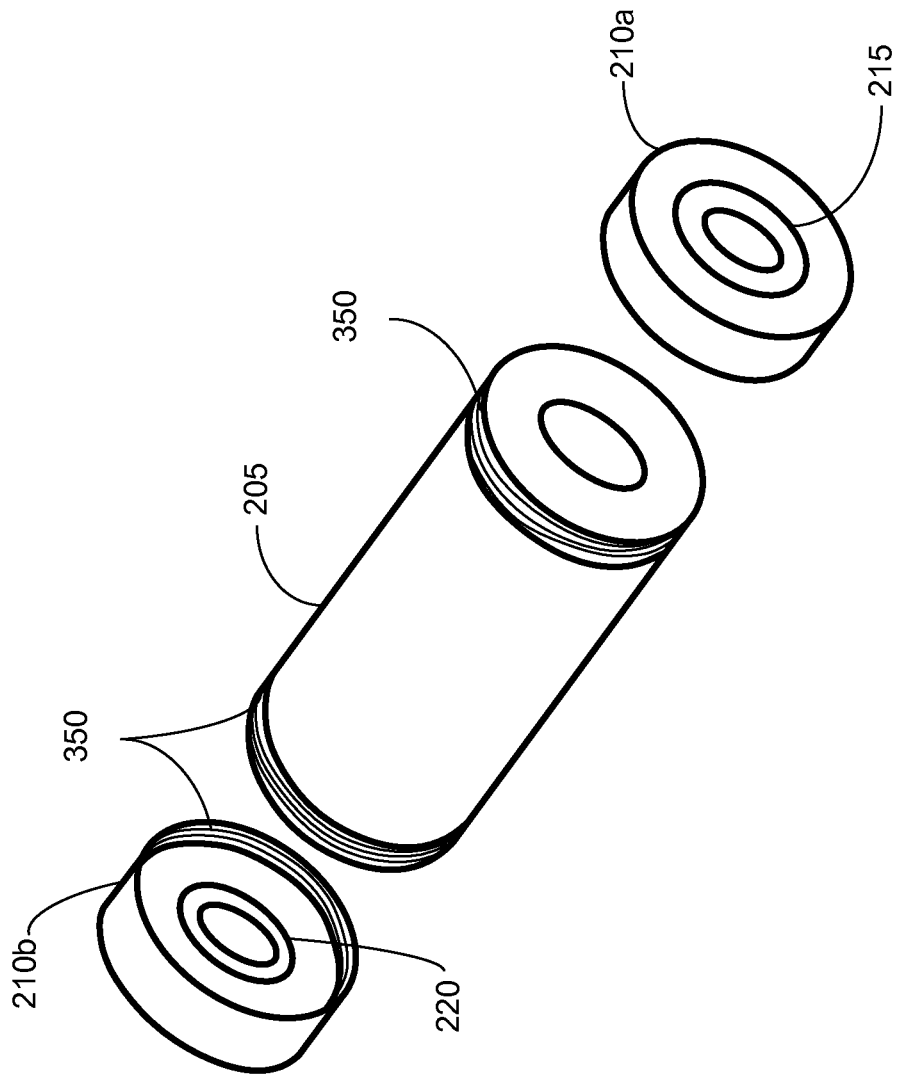
FIG. 3d depicts an exploded view of a threaded bearing housing, in accordance with some embodiments of the present invention.

In other embodiments, as shown in FIG. 3d, the end caps 210 can be threaded and can threadably engage the main housing 205. The end caps 210 and main housing 205 can be internally or externally threaded 350 to screw to screw together to provide both retention and sealing. In this configuration, sealing can be provided by, for example and not limitation, o-rings or thread sealant. In this manner, the number of penetrations in the end caps 210 is reduced, reducing infiltration points for water, dirt, and debris. As mentioned, the threads 350 can be internal or external to the components 350 and can be single or multi-start threads and can be, for example, metric, standard, or national pipe thread (NPT) thread pitch.

In some embodiments, the system 200 can be designed for "straight through" support of the prop shaft. In other words, when installed, the housing 205, and thus the bearings 220 and seals 215, can be designed to align directly with the prop shaft. In other embodiments, the system 200 can be designed with an offset. That is, it may be necessary due to space requirements or to avoid other components (e.g., rudders or propellers), for example, to offset the housing 205 with respect to the prop shaft. In this configuration, the housing 205 can be mounted at an offset angle from the prop shaft, with a complementary mounting angle built in to the end caps 210. In other words, while the housing 205 and end caps 210 are disposed at an offset angle with respect to the prop shaft, the bearings 220 and seals 215 can be mounted at the opposite angle in the end caps 210. In this manner, while the end caps 210 and housing 205 are offset, the bearings 220 and seals 215 are mounted at the correct angle for the prop shaft.

Figure 4A:
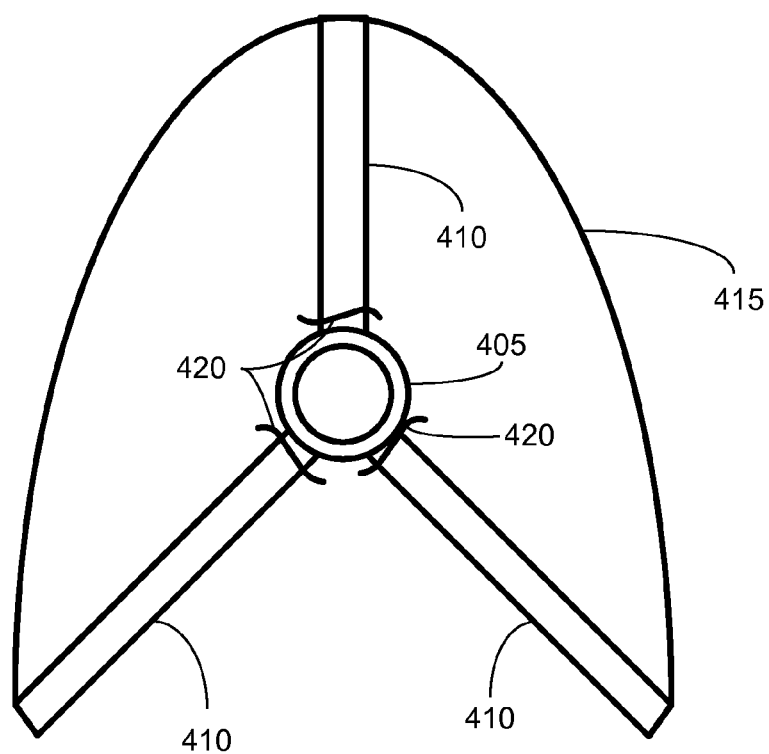
FIGS. 4a-4d depict the bearing housing being installed on a vehicle, in accordance with some embodiments of the present invention.
Figure 4B:
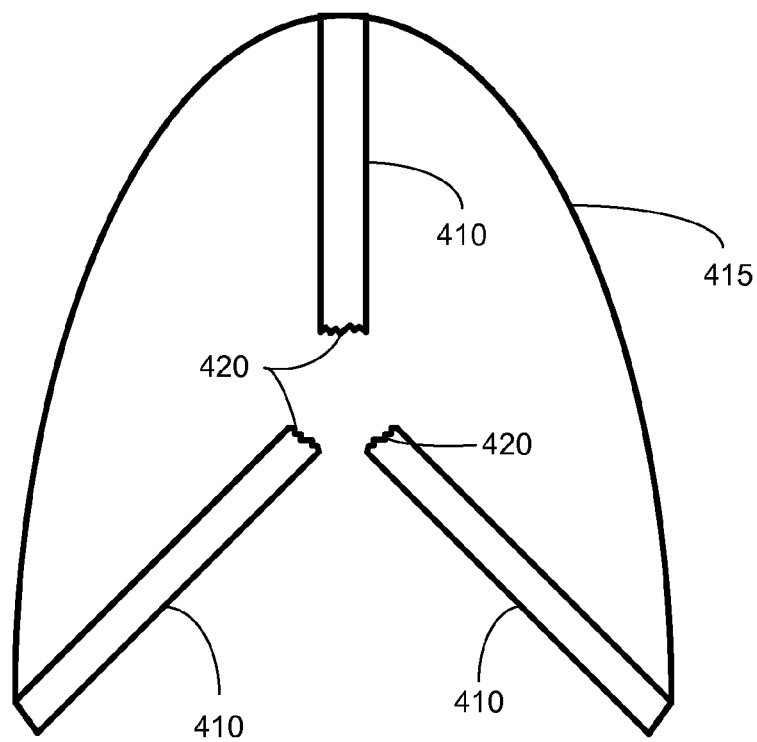

Embodiments of the present invention can also comprise a method for replacing existing prop shaft supports 405. FIG. 4a depicts a prop shaft support 405 mounted on a plurality of support arms 410 underneath the hull 415 of a boat or amphibious vehicle, for example, in some embodiments, the existing prop shaft support 405 can be removed by suitable means. In some applications, the prop support can simply be unbolted from its mount and removed. In other embodiments, the prop shaft support 405 may need to be cut free 420, or otherwise removed, from its mounting location. In some embodiments, the prop shaft support 405 can be removed with, for example and not limitation, a metal cutting saw, carbide wheel, or hack saw. As shown in FIG. 4a, in other embodiments, removal can be achieved with a cutting torch, plasma cutter, or other suitable means. As shown in FIG. 4b, in some embodiments, it may be necessary to dress, or otherwise finish, the cuts 420 on the existing mount 410 prior to installation of the housing 205. In some embodiments, the cuts 420 can be sanded, milled, cleaned, or otherwise prepared for installation of the system 200.

Figure 4C:
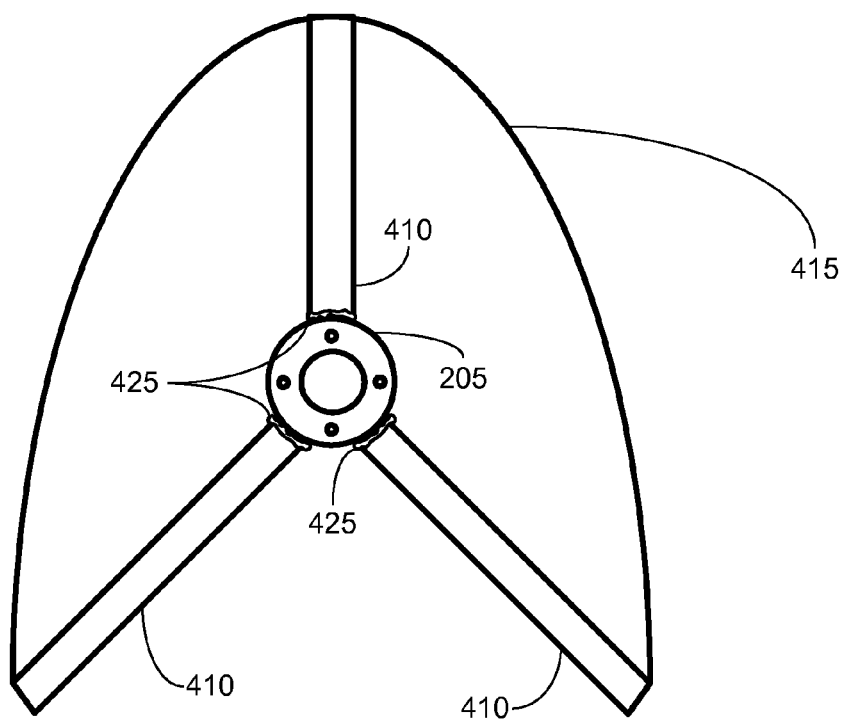

As shown in FIG. 4c, in some embodiments, the housing 205 can then be affixed to the existing mount 410. In some embodiments, this can be accomplished by welding 425 the housing 205 into the support. In other embodiments, the housing 205 can be, for example and not limitation, bolted, soldered, or adhered to the support. In some embodiments, the housing 205 can be affixed to the existing mount 410 using epoxy. In still other embodiments, the housing 205 can comprise an integral support or bracket that can be detachably affixed to, for example, the existing support 410, the hull 415 or chassis of the vehicle, or to the engine, transmission, or other component. In yet other embodiments, the old prop shaft support 405 and related bracketry can be completely removed and the housing 205 can comprise its own mounting bracket. The bracket can be, for example, integral to the housing 205 or a separate component.

As mentioned above, in some embodiments, the housing 205 can be a straight design, with no offset. In this configuration, care should be taken during installation to properly align the housing 205 with the prop shaft to minimize loads through the bearings 220. In other embodiments, as discussed above, the housing 205 can have a built-in offset, necessitating other angles.

Figure 4D:
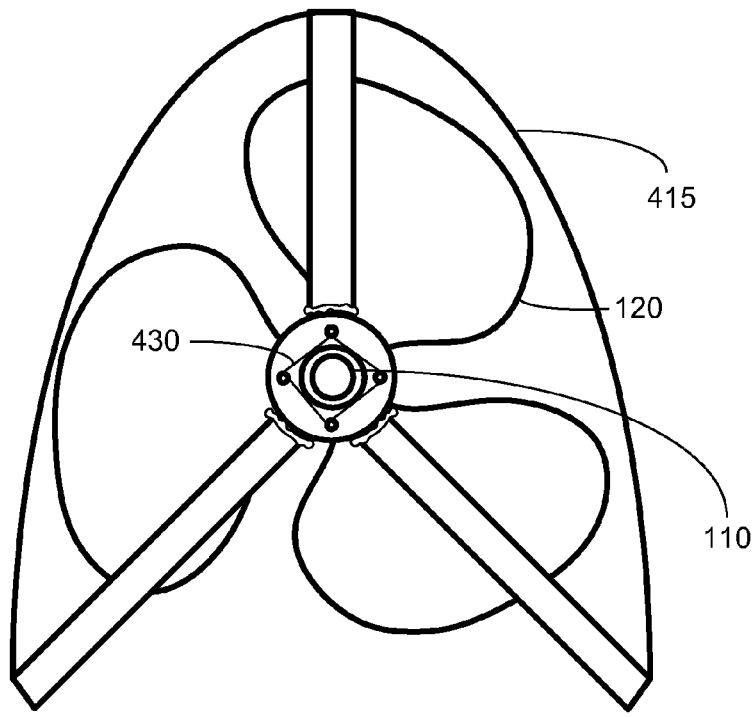

With the housing 205 in place, the bearing housings 210 and, if used, end caps 225 can be installed with appropriate fasteners 235. In some embodiments, the fasteners 235 can be secured with Loc-tite® or other thread locker or sealant (e.g., thread sealant) or can be safety wired 430, as shown in FIG. 4d. As discussed above, in some embodiments, the bearing housings 210 and end caps 225 can be sealed with o-rings 230. In other embodiments, the bearing housings 210 and/or end caps 225 can be sealed using an appropriate sealant such as, for example and not limitation, RTV silicone or anaerobic flange sealant. In other embodiments, the end caps 210 can be threaded onto the housing 205 and sealed with thread sealant or an o-ring, for example.

Due to the multi-piece design of the system 200, the prop shaft 110 and/or propeller 120 can be installed during or after assembly of the system 200. As shown in FIG. 3b, in some embodiments, it may be convenient to slide the system components 205, 210, 225 over the shaft 110 and/or propeller 120, install the shaft 110, and then assemble the system 200. In some embodiments, it may be desirable to install the system 200 on the shaft 110, install the shaft 110 in the vehicle 100, and then affix the system 200 to ensure alignment. In still other embodiments, it may be convenient to assemble the complete system 200 and then slide the prop shaft through the bearings 220 and seals 215 and attach it to the vehicle 100.

Figure 5:
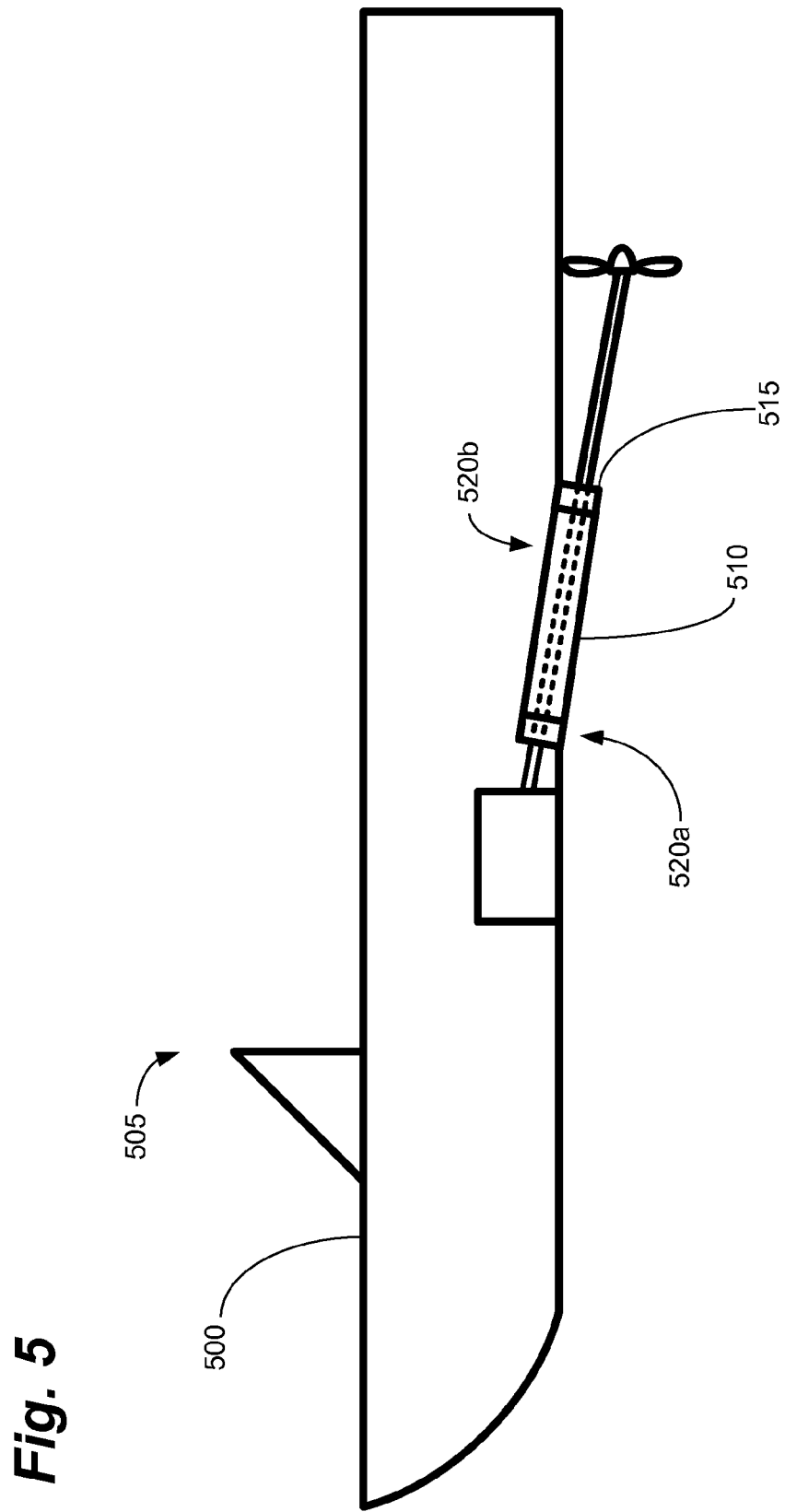
FIG. 5 depicts a second embodiment of a bearing housing installed on a motorboat, in accordance with some embodiments of the present invention.

In still other embodiments, as shown in FIG. 5, the system 505 can comprise a main housing 510 and a single bearing cap 515. In this configuration, the system 505 can be installed with a first end 520a disposed inside the vehicle 500 and a second end 520b disposed outside the vehicle 500. As shown, in a boat 500, the first end 520a of the system 505 can be, for example, fiberglassed, or otherwise mounted, into the boat 500 hull, with the second end 520b protruding into the water. In this manner, the lower end 520b of the system 505 is still accessible to ease service and maintenance.

In both cases, the system 200, 500 enables improved maintenance access because the end caps 210, 515 can be removed from the housing 205, 510 without removing the prop shaft 110. This can enable, for example, the bearings 220, seals 215, and lubricant to be inspected with the prop shaft 110 still in the vehicle 105. In addition, if only the lower bearing 220 and/or seal 215 needs to be serviced or replaced, the lower end cap 210, 515 can be removed with the prop shaft 110 installed. In other words, the user can remove the propeller 120, or otherwise disconnect the lower end of the prop shaft 110 (i.e. if it is a two-piece prop shaft), and then slide the lower end cap 210a off the end of the prop shaft 110 without removing the prop shaft 110. This is particularly useful in marine applications, for example, where the lower bearing 220 is most likely to be damaged by water infiltration (i.e., because it is lower in the housing 205, 510 and thus lower below the water line). Thus, the bearing 220 and seal 215 most likely to need attention are the most accessible.

While several possible embodiments are disclosed above, embodiments of the present invention are not so limited. For instance, while several possible configurations for the housing 205 and end caps 210 have been disclosed, other suitable materials and combinations of materials could be selected without departing from the spirit of embodiments of the invention. The system 200 is described above as using various techniques, such as welding, and various fasteners, such as cap screws. One of skill in the art will recognize, however, that additional methods and components could serve similar functions. In addition, while the system has been disclosed for use with a prop shaft on a boat or amphibious vehicle, it could also be used on other shafts or in other vehicles. In addition, the location and configuration used for various features of embodiments of the present invention can be varied according to a particular boat or vehicle that requires a slight variation due to, for example, the materials used and/or space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A system for supporting a shaft comprising:
a main housing;
a first bearing end cap, comprising a first end and a second end, the first bearing end cap comprising:
one or more bearings disposed in the first end of the first bearing end cap to at least partially support a shaft; and
one or more seals, disposed in the second end of the first bearing end cap to provide a substantially watertight seal between the first bearing end cap and the shaft;
wherein the first end of the first bearing end cap is detachably coupled to a first end of the main housing; and
wherein the coupling between the first bearing end cap and the main housing is substantially watertight.

2. The system of claim 1, further comprising:
one or more o-rings disposed on the first end of the first bearing end cap for sealing the first bearing end cap to the main housing.

3. The system of claim 1, wherein the one or more seals provides a watertight seal between the second end of the first bearing end cap and the shaft.

4. The system of claim 1, wherein the one or more bearings are roller bearings.

5. The system of claim 1, further comprising one or more fasteners detachably coupling the first end of the first bearing end cap to the main housing.

6. The system of claim 1, wherein the first end of the first bearing end cap threadably engages the main housing.

7. A system for supporting a shaft comprising:
a main housing comprising a first end and a second end;
a first bearing end cap, comprising a first end, a second end, the first end detachably coupled to the first end of the main housing;
a second bearing end cap, comprising a first end, a second end, a second bearing, and a second seal, the first end detachably coupled to the second end of the main housing;
a first bearing disposed in the first end of the first bearing end cap to partially support a shaft;
a second bearing disposed in the first end of the second bearing end cap to partially support the shaft;
a first seal disposed in the second end of the first bearing end cap to provide a substantially watertight seal between the shaft and the first bearing end cap; and
a second seal disposed in the second end of the second bearing end cap to provide a substantially watertight seal between the shaft and the second bearing end cap;
wherein the coupling between the first and second bearing end caps and the main housing is substantially watertight.

8. The system of claim 7, further comprising:
a third seal disposed on the first side of the first bearing end cap sealing against the first end of the main housing; and
a fourth seal disposed on the first side of the second bearing end cap sealing against the second end of the main housing.

9. The system of claim 7, wherein the first and second seals are o-rings.

10. The system of claim 7, further comprising:
a first bearing housing cover disposed on the second end of the first bearing end cap; and
a second bearing housing cover disposed on the second end of the second bearing end cap.

11. The system of claim 10, further comprising:
a third seal disposed on the second end of the first bearing end cap sealing against the first bearing housing cover; and
a fourth seal disposed on the second end of the second bearing end cap sealing against the second bearing housing cover.

12. The system of claim 7, wherein the first and second seals are lip seals.

13. The system of claim 7, wherein the first and second seals comprise rope packing.

14. The system of claim 7, wherein the first and second bearings are roller bearings.

15. The system of claim 7, further comprising a lubricant disposed in the main housing to lubricate the first and second bearings.

16. The system of claim 15, wherein the first and second bearings are plain bearings.

17. The system of claim 7, wherein the first and second bearings are threadably coupled to the main housing.

18. The system of claim 7, further comprising a plurality of fasteners detachably coupling the first and second bearings to the main housing.

* * * * *